Jan. 12, 1937.　　　　L. K. SOTEROS　　　　2,067,247
TOOL
Filed March 17, 1934
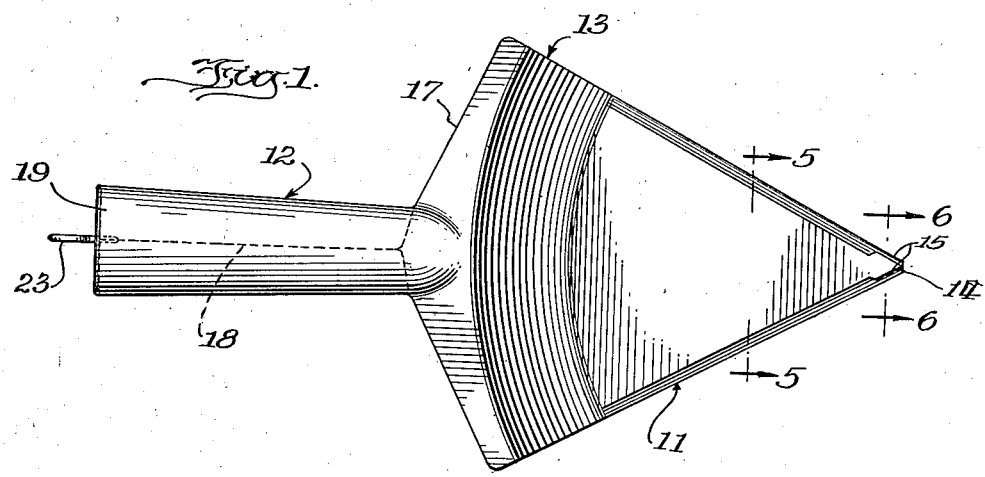
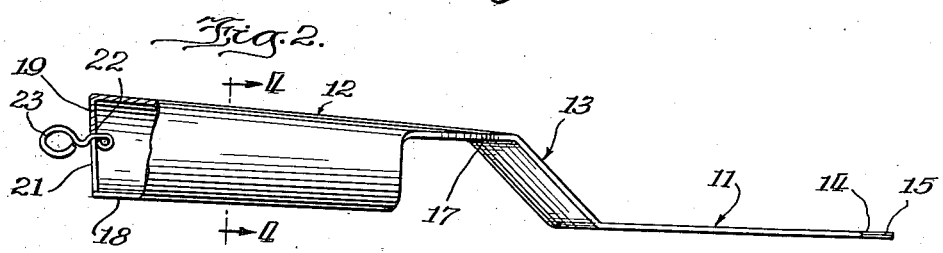
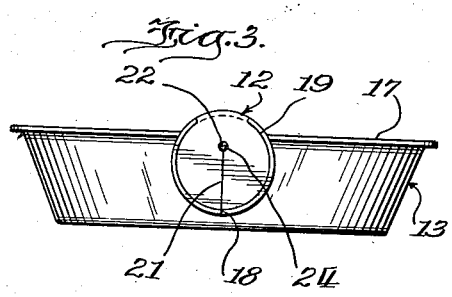 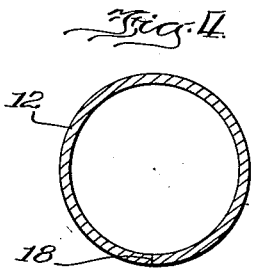
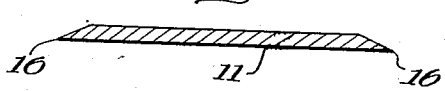 
Inventor:
Lambros K. Soteros
By Williams, Bradbury, McCaleb & Hinkle
Attys.

Patented Jan. 12, 1937

2,067,247

UNITED STATES PATENT OFFICE 2,067,247

TOOL

Lambros K. Soteros, Chicago, Ill.

Application March 17, 1934, Serial No. 716,030

1 Claim. (Cl. 146—206)

This invention relates to tools or implements and includes among its objects the provision of a unitary or one piece implement having a blade, a handle with its major axis substantially parallel to the plane of the blade and offset therefrom, and a connecting flange or member so disposed and of such conformation as to lend rigidity and strength to the implement; and the provision of such an implement which is capable of a plurality of uses such as scraping or smoothing surfaces, cutting more or less semiplastic materials, and/or carrying scrapings or cuttings.

Other objects and advantages of my invention will appear more fully from the following description and from the accompanying drawing, in which similar characters of reference indicate similar parts throughout the several views.

Referring to the drawing,

Figure 1 is a plan view of an implement embodying the features of the invention;

Figure 2 is a side elevation of the implement shown in Figure 1 and is shown partially in section to bring out certain details of construction;

Figure 3 is an end elevation of the implement shown in the preceding figures;

Figure 4 is a cross-section taken substantially along the line 4—4 of Figure 2;

Figure 5 is a cross-section taken substantially along the line 5—5 of Figure 1; and Figure 6 is a cross-section taken substantially along the line 6—6 of Figure 1.

The novel tool of the invention is preferably cut or otherwise formed from a single piece or sheet of metal to provide a substantially sector-shaped blade or carrier portion 11, a handle portion 12, and an intermediate or connecting arcuate portion 13.

The blade or carrier portion 11 preferably has a blunt tip 14 provided with knife edges 15 at opposite sides thereof and converging toward the tip. As shown more particularly in Figures 2 and 6, the knife edges 15 are made by beveling the opposite faces of the tip toward the sides thereof. Inwardly of the inner extremities of the knife edges 15 the sides of the blade are beveled from only one surface thereof to provide edges 16 (see Figure 5) suitable for scraping or cutting purposes.

The arcuate connecting portion 13 inclines upwardly from the blade 11 and has a rearwardly extending flange portion 17 which connects at its rear side to the forward end of the handle 12. This handle 12 is made by bending or forming the material rearwardly of the flange portion 17 to provide a tubular or hollow construction with a longitudinal slit 18 therein. The rear end of the handle has a closure member 19 integral therewith and having a radial slot 21 communicating with an aperture 22 centrally of the closure member for receiving a hook 23 provided to facilitate hanging or suspending the tool when it is not in use.

The hook 23 is assembled in the aperture 22 by springing the lower side (Figure 2) of the closure member 19 outwardly from the end of the handle and inserting the shank of the hook in the radial slot 21 with the retaining portion 24 of the hook arranged at the inner side of the closure member. The hook is then moved in the slot to the position shown in Figure 2 where the shank extends through the aperture 22, the lower side of the closure member meanwhile being permitted to spring back to its normal closing position.

The tool described above is not only a general simplification of tools of this class but, in addition, the edges 16 provide excellent scrapers without interfering with the use of the blade as a smoothing tool or as a carrier. The novel tool of the invention as described above, while made from a single piece of metal, is nevertheless sufficiently rigid and strong by virtue of the strengthening arcuate connecting portion 13 intermediate the handle and the blade and providing an upstanding abutment for cooperating with the blade when used as a carrier for supporting the material on the blade.

Such a tool is capable of many uses, as will readily appear to skilled persons, but is particularly useful in the art of pastry-making as a scraping, smoothing, carrying and/or cutting implement.

While I have illustrated and described a specific embodiment of my invention, many modifications may be made without departing from the spirit of the invention, and I do not wish to be limited to the precise details set forth but desire to avail myself of all changes within the scope of the appended claim.

I claim:

In a tool of a single piece of metal, the combination with tool suspending means, of a hollow, tubular handle portion having an end closure member provided with a central aperture and with a radial slot communicating with said aperture to facilitate assembling said means in said aperture, a sector-shaped carrier portion substantially parallel to and offset from the major axis of said handle portion and having its sides outwardly beveled from its top surface to provide scraping and cutting edges and having a blunt tip portion forwardly of said scraping and cutting edges, said blunt tip portion having its sides outwardly beveled from its top and bottom surfaces to provide knife edges for cutting, and an inclined arcuate portion connecting said carrier and said handle portion.

LAMBROS K. SOTEROS.